(12) United States Patent
Gomez (10) Patent No.: US 11,233,578 B2
(45) Date of Patent: *Jan. 25, 2022

(54) SILICON PHOTONICS BASED OPTICAL NETWORK

(71) Applicant: Seagate Technology LLC, Fremont, CA (US)

(72) Inventor: Kevin A. Gomez, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/862,408

(22) Filed: Apr. 29, 2020

(65) Prior Publication Data

US 2020/0259568 A1     Aug. 13, 2020

Related U.S. Application Data

(63) Continuation of application No. 16/111,063, filed on Aug. 23, 2018, now Pat. No. 10,644,808.

(60) Provisional application No. 62/549,107, filed on Aug. 23, 2017.

(51) Int. Cl.
| | |
|---|---|
| *H04B 10/70* | (2013.01) |
| *H04J 14/02* | (2006.01) |
| *H04Q 11/00* | (2006.01) |
| *H04B 10/67* | (2013.01) |

(52) U.S. Cl.
CPC .......... *H04B 10/70* (2013.01); *H04J 14/0267* (2013.01); *H04Q 11/0003* (2013.01); *H04Q 11/0066* (2013.01); *H04B 10/67* (2013.01)

(58) Field of Classification Search
None
See application file for complete search history.

(56) References Cited

U.S. PATENT DOCUMENTS

| | | | |
|---|---|---|---|
| 6,195,187 B1 * | 2/2001 | Soref ................. | G02B 6/12007 398/9 |
| 6,411,752 B1 * | 6/2002 | Little ................. | G02B 6/12002 385/17 |
| 6,909,824 B1 * | 6/2005 | Messica ............. | G02B 6/12007 385/15 |
| 8,027,587 B1 | 9/2011 | Watts | |
| 8,519,803 B2 | 8/2013 | McLauren | |
| (Continued) | | | |

FOREIGN PATENT DOCUMENTS

WO    2002101421 A2    12/2002

OTHER PUBLICATIONS

Goebuchi et al., Optical cross-connect circuit using hitless wavelength selective switch, 2008, OSA (Year: 2008).*

(Continued)

*Primary Examiner* — Jai M Lee
(74) *Attorney, Agent, or Firm* — Holzer Patel Drennan (57) ABSTRACT

Various implementations of network devices disclosed herein provide a method routing a data packet in an optical domain, the data packet including a first component or header and second component or routing information, stripping the first component or header from the data packet using a silicon photonic component, processing the first component or header in an electrical domain, and communicating the data packet without the first component or header to an optical delay line.

16 Claims, 7 Drawing Sheets

(56) References Cited

U.S. PATENT DOCUMENTS

| | | | |
|---|---|---|---|
| 9,261,754 B2 | 2/2016 | Xu | |
| 9,551,836 B2 | 1/2017 | Frankel | |
| 9,608,406 B1* | 3/2017 | Lee | H01S 5/1032 |
| 9,654,853 B2 | 5/2017 | Mehrvar | |
| 10,644,808 B2* | 5/2020 | Gomez | H04B 10/70 |
| 2001/0017723 A1* | 8/2001 | Chang | H04L 69/168 |
| | | | 398/82 |
| 2002/0027686 A1* | 3/2002 | Wada | H04Q 11/0066 |
| | | | 398/87 |
| 2003/0133641 A1* | 7/2003 | Yoo | G02B 6/12007 |
| | | | 385/14 |
| 2004/0013355 A1 | 1/2004 | Margalit | |
| 2004/0240771 A1 | 12/2004 | Driessen | |
| 2005/0053375 A1 | 3/2005 | Yoo | |
| 2006/0153267 A1 | 7/2006 | Suzuki | |
| 2007/0110453 A1* | 5/2007 | Akiyama | H04B 10/504 |
| | | | 398/182 |
| 2008/0044184 A1 | 2/2008 | Popovic | |
| 2008/0193133 A1* | 8/2008 | Krug | G02F 1/3132 |
| | | | 398/83 |
| 2009/0154505 A1 | 6/2009 | Oh | |
| 2009/0190875 A1 | 7/2009 | Bratkovski | |
| 2009/0226129 A1* | 9/2009 | Kuipers | G02F 1/3132 |
| | | | 385/14 |
| 2009/0304327 A1 | 12/2009 | Green | |
| 2010/0209038 A1 | 8/2010 | Popovic | |
| 2010/0209061 A1* | 8/2010 | Sumetsky | G02B 6/2861 |
| | | | 385/123 |
| 2010/0266232 A1 | 10/2010 | Lipson | |
| 2011/0103799 A1 | 5/2011 | Shacham | |
| 2011/0170821 A1* | 7/2011 | Lipson | G02F 1/025 |
| | | | 385/8 |
| 2011/0310917 A1 | 12/2011 | Krishnamoorthy | |
| 2012/0045167 A1* | 2/2012 | Julien | G02B 6/12002 |
| | | | 385/14 |
| 2012/0251042 A1* | 10/2012 | Julien | G02B 6/12019 |
| | | | 385/17 |
| 2013/0161496 A1 | 6/2013 | Akiyama | |
| 2014/0321848 A1 | 10/2014 | Sekiguchi | |
| 2015/0168803 A1* | 6/2015 | Xu | G02F 1/353 |
| | | | 359/332 |
| 2015/0277053 A1* | 10/2015 | Zheng | H04J 14/00 |
| | | | 385/31 |
| 2015/0323450 A1 | 11/2015 | Lipson | |
| 2019/0113686 A1* | 4/2019 | Matres | G02B 6/4215 |

OTHER PUBLICATIONS

Goebuchi et al., Optical cross-connect circuit using hitless wavelength selective switch, 2008, IEEE (Year: 2008).*

Titriku, Alex Kwasi Nyavor, Efficient Wavelength Tuning Techniques for Integrated Silicon Photonics, 2014 (Year: 2014).*

Goebuchi et al., Optical cross-connect circuit using hitless wavelength selective switch, 2008, Optics Express, pp. 535-548 (Year: 2008).

Titriku Alex, Efficient Wavelength Tuning Techniques for Integrated Silicon Photonics, 2014 (Year: 2014).

Wikipedia, Resonance, Nov. 2015 (Year: 2015).

* cited by examiner

SILICON PHOTONICS BASED OPTICAL NETWORK

CROSS-REFERENCE TO RELATED APPLICATIONS

This application is a Continuation of patent application Ser. No. 16/111,063 which was filed on Aug. 23, 2018, entitled Silicon Photonics Based Optical Network, which is a non-provisional application based on and claims priority to U.S. Provisional Application Ser. No. 62/549,107 entitled "Silicon Photonics Based Storage Network" filed on Aug. 23, 2017. The disclosures set forth in the referenced applications are incorporated herein by reference in their entireties.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

Various implementations of storage devices disclosed herein provide a method routing a data packet in an optical domain, the data packet including a header including routing information, stripping the header from the data packet using a silicon photonic component, processing the header in electrical domain, and communicating the data packet without the header to an optical delay line.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification.

DETAILED DESCRIPTION

Currently high-performance computing systems composed of many ASIC devices utilize copper interconnect to allow the devices to communicate. This interconnect creates bandwidth bottlenecks between the devices that can be the limiting factor in a system's performance. New advances in micro-ring resonators (MRRs) promise increased chip-to-chip communication bandwidth and latency by utilizing optical interconnect rather than physical interconnect. This presents some new challenges to be solved of how to efficiently route information in an optical interconnect network with minimal latency. An implementation proposed herein solves this problem by identifying destination identifications (IDs) by assigning each destination a specific set of wavelengths so that any source can have its transmission routed to the final destination just by transmitting on a specific set of wavelengths.

In a system such as this there is a substantial amount of interconnect bandwidth as compared to copper since transmissions to different destinations can be simultaneously sent on the same optical element. However, when multiple sources all try to transmit to the same destination, at some points in the interconnect, those transmissions may conflict with one another leading to loss of that transmission without an arbitration scheme.

Figure 1:
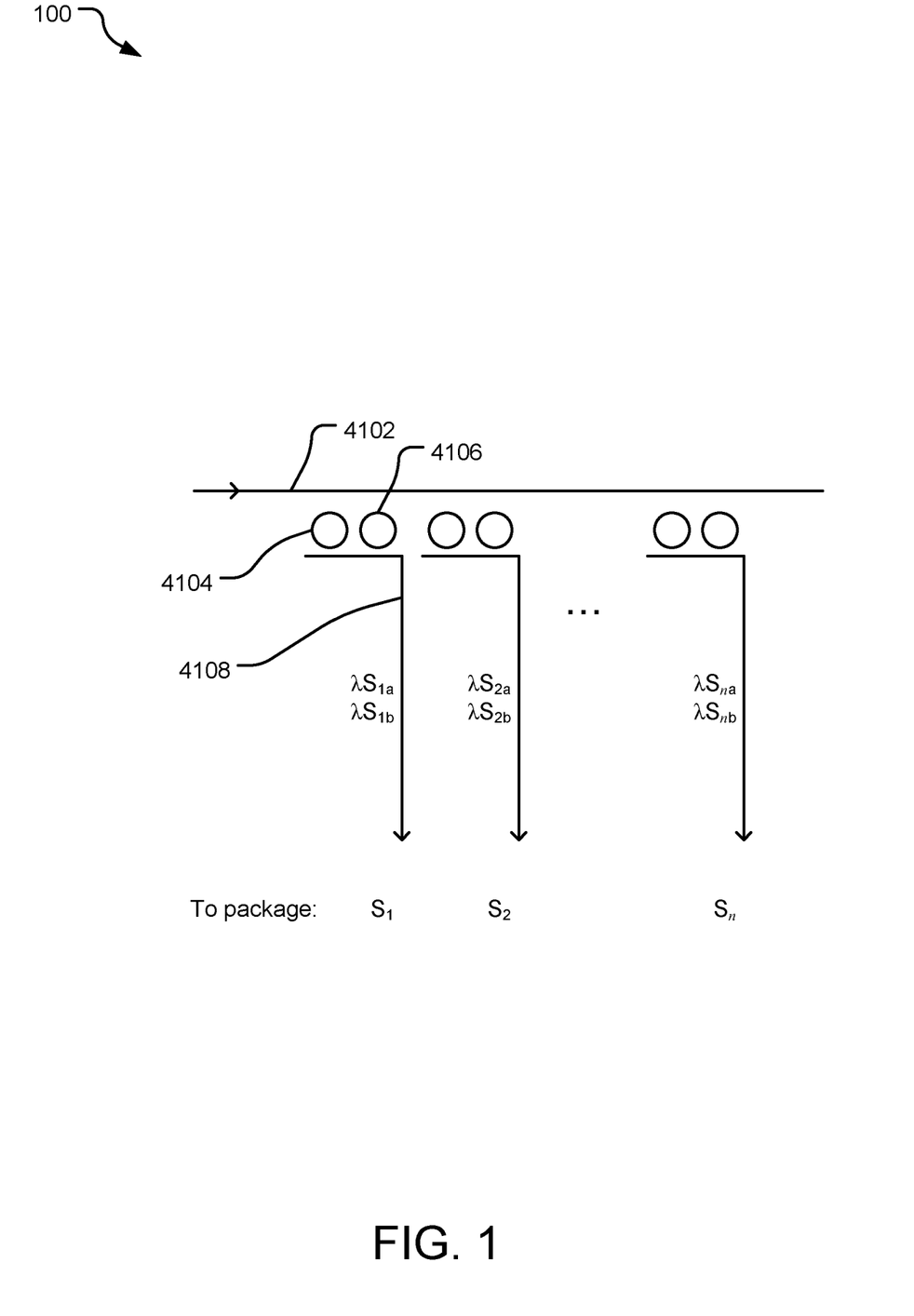
FIG. 1 illustrates an example communication network with a number of waveguides, each of the waveguides configured to communicate optical signals over a number of wavelengths.

FIG. 1 illustrates a communication network 100 with a number of waveguides, each of the waveguides configured to communicate optical signals over a number of wavelengths. Specifically, the communication network 100 includes an incoming waveguide 4102 that carries optical signals over a large number of different wavelengths. For example, the incoming waveguide 4102 may be carryings a large number of optical signals from a controller where each of these signals are to be directed to a different destination packages $S_1$, $S_2$, $S_3$, etc.

Silicon photonic components 4104, 4106 are configured in the vicinity of the waveguides 4102 and they resonate at given wavelengths such that they are able to alter the path of optical signals traveling on an incoming waveguide 4102 towards an outgoing waveguide 4108. In one implementation, the silicon photonic components 4104, 4106 are implemented using ring resonators, such as micro ring resonators (MRRs). An MRR's wavelength can be changed (by heating it up or down) in approximately 16 micro-second from one frequency to any other frequency/channel. Alternatively, the silicon photonic components 4104, 4106 are implemented using Mach-Zehnder Interferometer (MZI) SiPh component. In some alternative embodiments, the silicon photonic component may be a magnetic ring resonator.

For example, a command may come in on wavelength λx at 4102 and the communication network 200 may need to respond to (forward) that command on wavelength λy. Based on an incoming wavelength λx, the system knows the processor the command came from. Furthermore, based on the wavelength λy, the system may also know a package Si of NAND device that the command is directed to. In one implementation, when a read command comes in, the communication network 200 may have 10 micro-second before data starts coming in. Thus, the communication network 200 may have 10 micro-second to determine which NAND drive the data is directed to. Thus, the communication network 200 has 10 micro-second to tune the MRR 4104, 4106. This is of the order of the time it takes to tune the MRR (16 micro-second).

When a NAND controller managing the communication network 200 has staggered commands on wavelength 4104 coming in, if there are two MRRs 4104 and 4106 to choose from, the system can tune one MRR 4014 while transmitting on the other wavelength. For example, the MRR 4104 may be configured to resonate at a wavelength $\lambda s_{1a}$ and the MRR may be configured to resonate at a wavelength $\lambda s_{1b}$. As a result, an optical signal traveling on the waveguide 1102 at the frequencies $\lambda s_{1a}$ and $\lambda s_{1b}$ are directed to the destination package Si. In this implementation, tuning of the MRRs is happening in the electrical domain.

Figure 2:
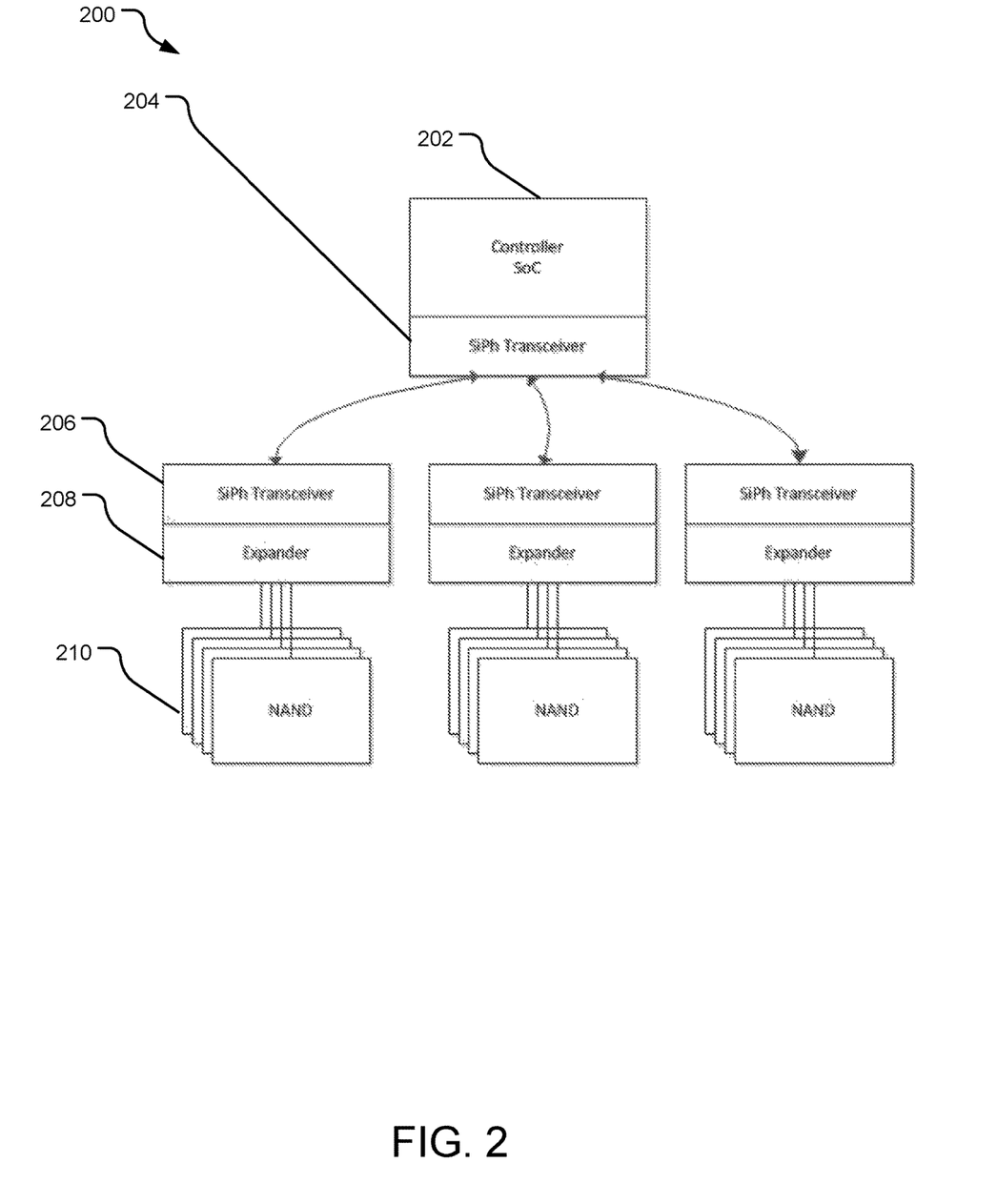
FIG. 2 illustrates an example block diagram of a system to increase the input/output (I/O) capacity of a storage system controller or a system on chip (SOC) by I/O expansion using silicon photonics.

FIG. 2 illustrates an example block diagram 200 of a system to increase the input/output (I/O) capacity of a storage system controller or a system on chip (SOC) by I/O expansion using silicon photonics. Specifically, the storage controller 202 is configured with a silicon photonics transceiver 204 that converts one or more electrical domain signals into optical signals. The optical signals are communicated over an optical network to various silicon photonic transceivers 206 that are configured with expanders 208. The silicon photonic transceivers 206 convert the received optical signal into a signal in electrical domain and feed them into the expanders 208.

Each of the expanders are connected to multiple NANDs 210 to communicate the electrical domain signals thereto. Datacenters are moving toward data-centric architectures driven by the need for performance and energy efficiency. In data-centric architectures, large pools of memory are shared by pools of heterogeneous compute resources (CPU, GPU, TPU, FPGAs, etc). These architectures require and are enabled by low latency (<<100 ns) network fabrics for example using SiPh. Various implementations move to lower latency memory-semantics based fabrics (such as Omnipath, Gen-Z, etc.). These are still wire-based and have lower limits of latency and energy/bit due to RLC of wires.

Implementations disclosed herein use MRR based transceivers as well as routing structures to make interconnect latency a function of light-speed rather than RLC delays. Maximizes energy efficiency and minimizes latency by keeping data in the optical domain as much as possible and switching back to the electrical domain only for compute and storage. Important because it enables any point to point latency within a datacenter to be close to speed-of-light delays. This in turn enables data or memory-centric architectures in datacenters.

Figure 3:
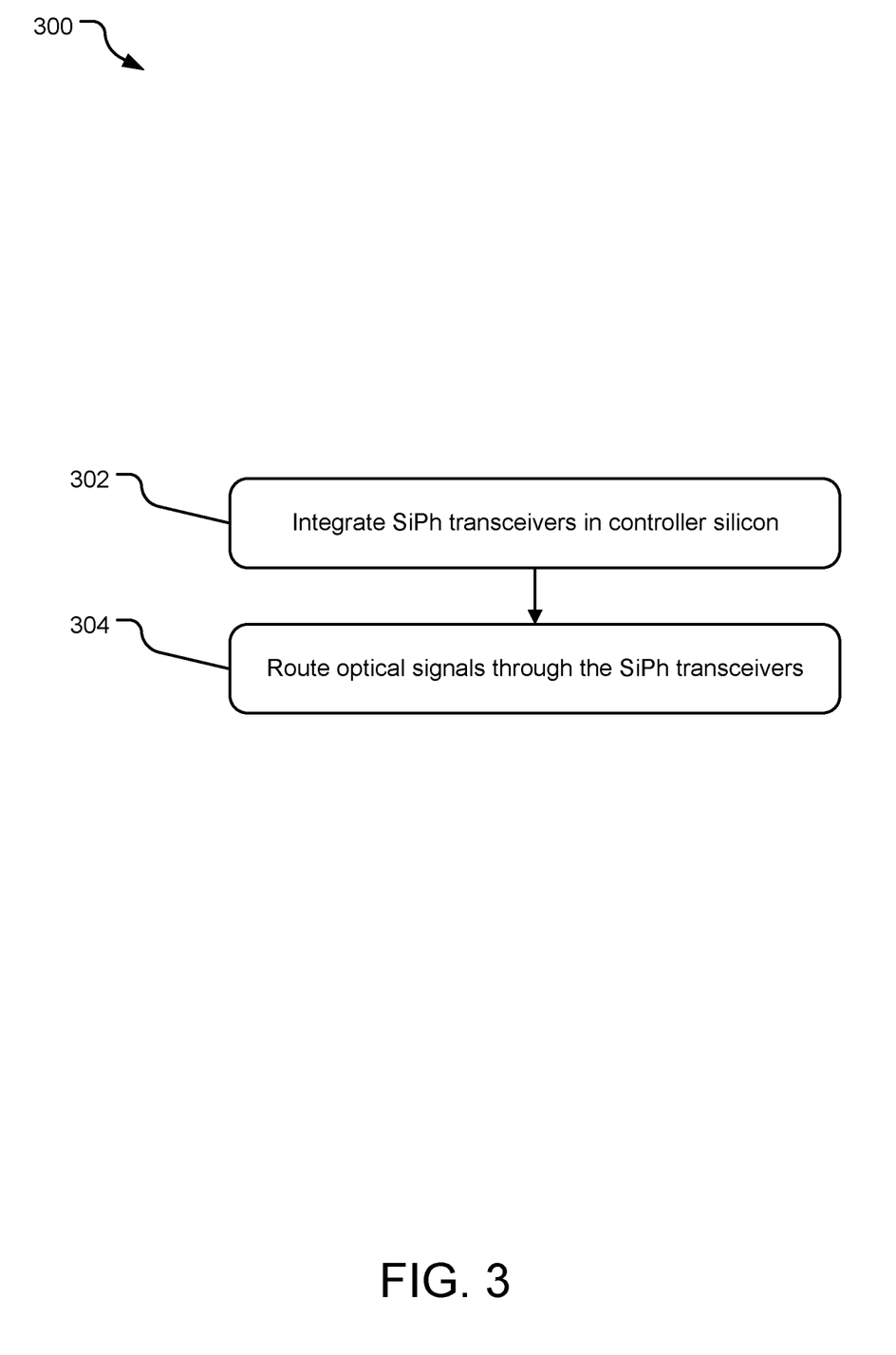
FIG. 3 illustrates example operations for efficiently routing or switching optical signals for data-centric datacenter architectures.

For example, in an implementation disclosed in FIG. 3, an operation 302 integrates SiPh transceivers in controller silicon to implement the physical layer of memory and compute interfaces (Gen-Z, OmniPath). These transceivers may be integrated into the memory controller SoC (e.g. SSD, or HDD) as well as in memory packages (NAND, SCM, HBM). An operation 304 routes optical signals through the SiPh transceivers.

Figure 4:
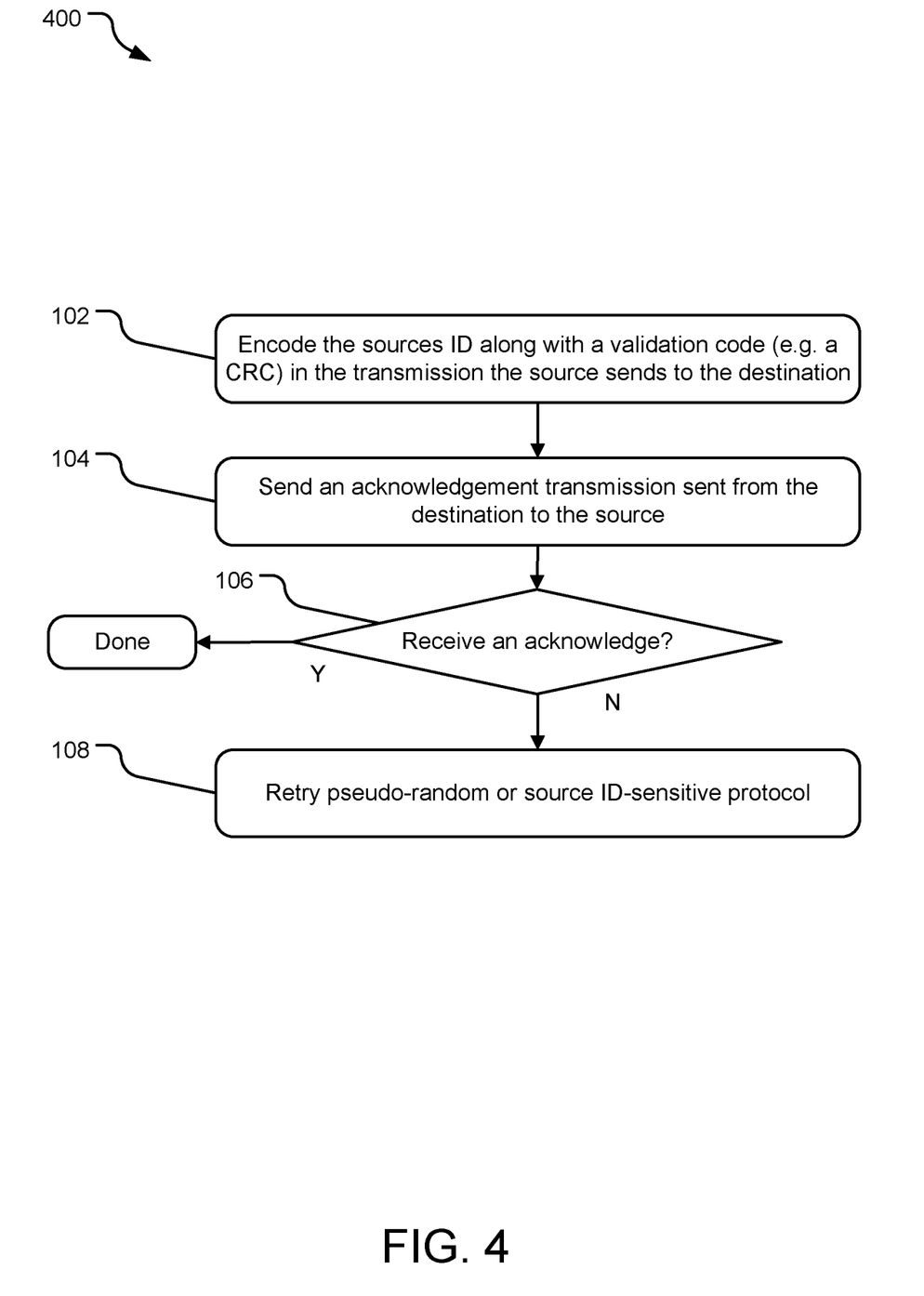
FIG. 4 illustrates example operations for arbitrating access to a set of wavelengths in a wavelength-identified optical ASIC interconnect network.

An arbitration scheme disclosed herein allows for conflicts to be resolved by a method disclosed by the operations 400 illustrated in FIG. 4. An operation 102 encodes the sources ID along with a validation code (e.g. a cyclic redundancy check "CRC") in the transmission the source sends to the destination. An operation 104 sends an acknowledgement transmission sent from the destination to the source to validate that a valid transmission has been received by the destination (i.e. it hasn't been corrupted by other transmissions).

A pseudo-random or source ID-sensitive retry protocol 108 is performed where the source retransmits its transmission if it doesn't not receive an acknowledge signal within an implementation-specific period of time at 106. The time between retries is either randomized or is affected by the source ID itself so that subsequent re-transmissions by non-acknowledged sources have an increasing probability of a successful transmission.

Memory controllers need to address an increasing number of memory devices. These controller SoCs are pad limited when it comes to addressing hundreds of memory devices (Flash, ReRAM, SCM, DRAM etc). The use of bus-expander silicon has been the typical approach in addressing this challenge. The issue with this approach is that it uses long reach (often) parallel buses which require significant energy and are speed limited.

An implementation disclosed herein exploits recent advancements in silicon photonic micro-ring resonator (MRR) based transceivers capable of being manufactured in standard CMOS processes and hence monolithically integrate-able into memory controller silicon. Interconnects using this technology have latencies dependent on speed of light and are not subject to the distance dependent energy losses and delays of wires. The MRR approach minimize or eliminate the need for the inefficiency of multiple conversions between the electronic and optical domains as with previous solutions. IO power for flash buses today is 10 pJ/bit and is a function of distance. Use of silicon photonics is expected to reduce this by an order of magnitude.

In one implementation, an MRR based Silicon Photonics (SiPh) transceivers are integrated into the memory controller silicon as well as the memory device multiplexer/driver silicon. Super-Luminescent Diodes (SLDs) provide multi-wavelength continuous wave (CW) light for each transmitter. Single-mode fibers or optical waveguides embedded in the PCB interconnect the controller silicon with the multiple expanders. Each single-mode fiber conducts DWDM (dense-wavelength division multiplexing) signals in one direction (from transmitter to receiver). 400 Gbps using 20 wavelengths around 1500 nm per fiber is feasible. Using low loss coupling methods between transceivers and PCB waveguides would allow a single SLD to push data over multiple-drop receiver devices.

Figure 5:
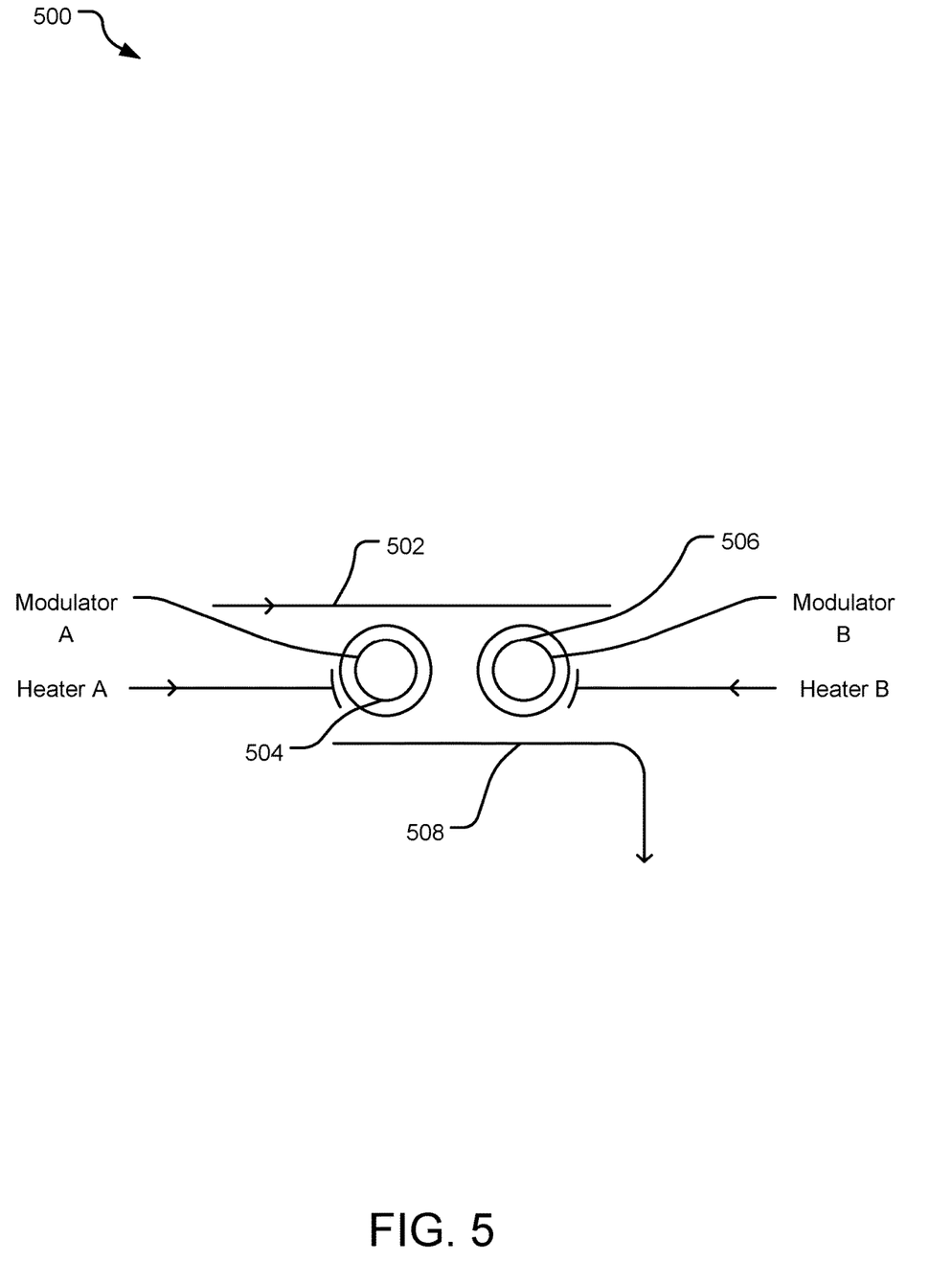
FIG. 5 illustrates an example communication network using MRRs with selective wavelength keying.

FIG. 5 illustrates a communication network 500 using MRRs using selective wavelength keying. Specifically, in FIG. 5 an incoming waveguide 502 is configured to communicate optical signals over a plurality of wavelengths. A combination of a first MRR 504 and a second MRR 506 is configured to alter the path of optical signals traveling on the incoming waveguide 502 towards an outgoing waveguide 508. In one implementation, the first MRR 504 is configured to resonate at a first wavelength $\lambda s_{1a}$ to direct a first component of an incoming optical signal towards the outgoing waveguide 508. Specifically, the resonant wavelength of the second MRR 506 is keyed down using charge carrier modulation of the second MRR 506 as the resonant wavelength of the second MRR 506 transitions from a first value to a second value, with the first value and the second value being on opposite side of the resonant wavelength $\lambda s_{1a}$ of the first MRR 504. A heater A may heat the first MRR 504 to key it to a given wavelength while heater B may heat the second MRR 506 to key it to a different wavelength.

In one implementation, the resonant wavelength of the second MRR 506 transitions from a first value to a second value in response to change in a heater power applied to the second MRR 506 as further illustrated below in FIG. 6. In an alternative implementation, the resonant wavelength of the second MRR 506 is keyed down using charge carrier modulation of the second MRR 506 by approximately 0.05 nm.

Figure 6:
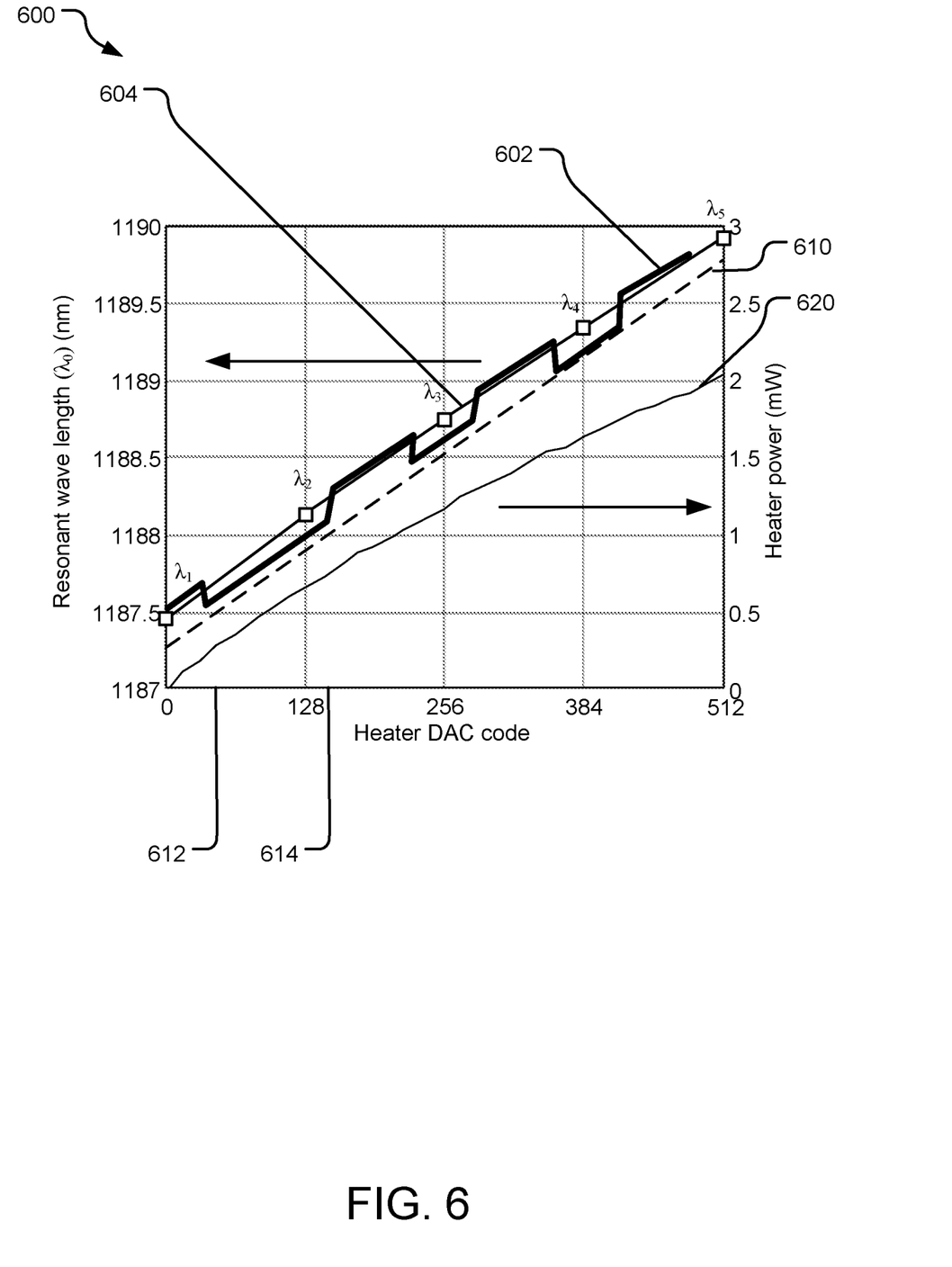
FIG. 6 illustrates an example graph illustrating relation between resonant wavelength of MRRs and heater power applied to the MRRs.

FIG. 6 illustrates a graph 600 illustrating relation between resonant wavelength of MRRs and heater power applied to the MRRs for selective wavelength keying. Herein, a line 602 shows the actual wavelength as it is rapidly crossing between wavelengths $\lambda_1$ to $\lambda_5$ shown on a line 604. A line 610 illustrates what the wavelength would be when the MRRs are keyed with the charge carrier. As shown here, using the charge carrier, the system can key MRR down at 612 and let it follow the line 602 under $\lambda 2$ and key it back up at 614. As the system can key the MRR down only in one direction, just before it hits $\lambda 3$, the system can key the MRR down and then let it go and when it goes above $\lambda 3$, I can go above it. A line 620 illustrates how many mW of power is needed in to the heater for it to move the resonant wavelength.

Figure 7:
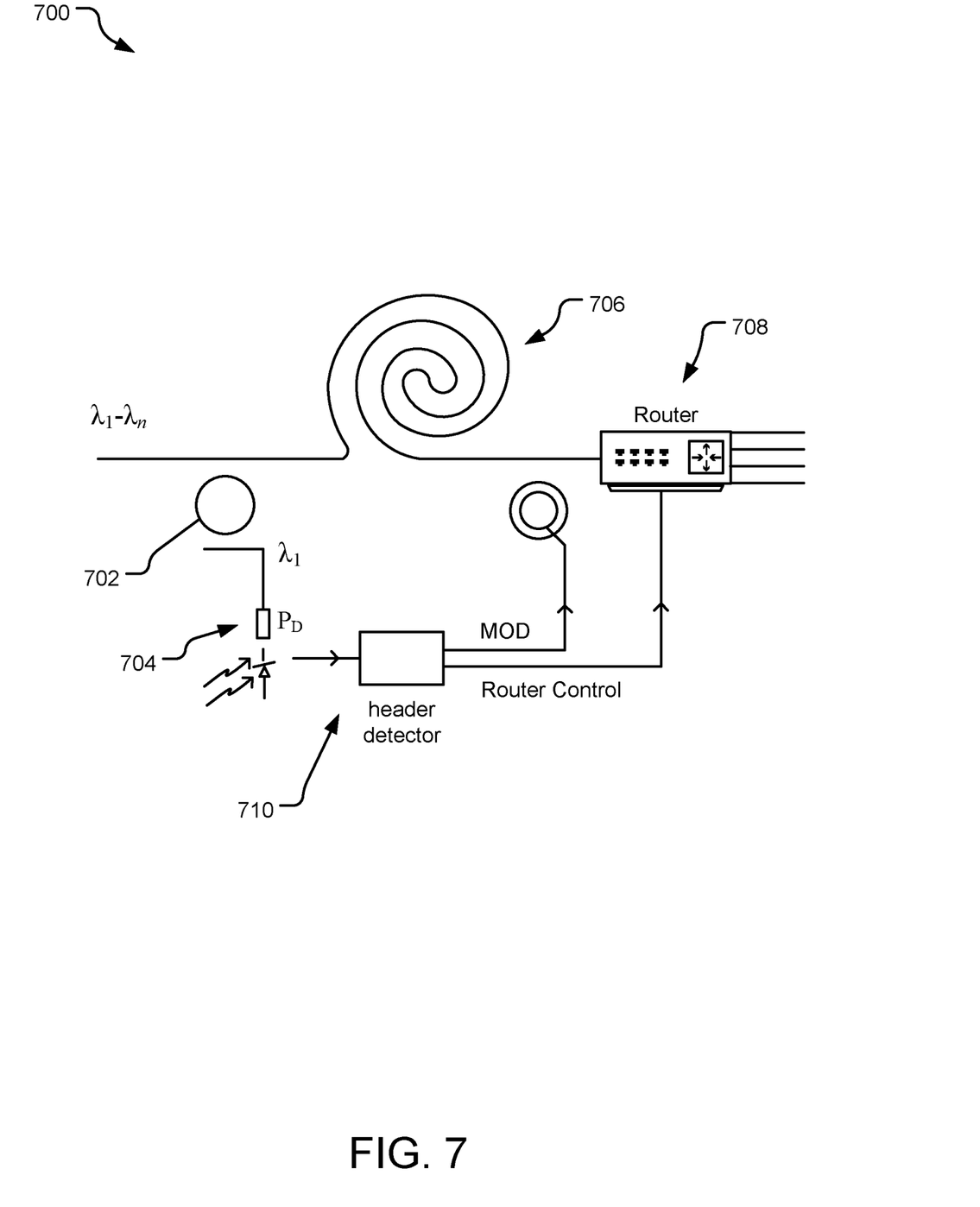
FIG. 7 illustrates an example communication network with optical delay lines for silicon photonics routing.

FIG. 7 illustrates a communication network 700 with optical delay lines for silicon photonics routing. For example, the communication network 700 may have various data packets travelling over different wavelengths $\lambda_1$-$\lambda_w$. In one implementation of the communication network 700, each packet traveling on the communication network 700 has a first data component (in some embodiments a header) including a second data component (in some embodiments routing information). In one implementation, the header may be a predetermined number of bits or a barker code. Each packet traveling on the communication network 700 may travel on its own wavelength. A drop filter (not shown) listens to the packets being communicated over the communication network 700. When the drop filter detects a header, it turns off the drop filter so that the remainder of the data packet continues on the communication network 700 while the header is stripped using a silicon photonic component 702.

In one implementation, the silicon photonic component 702 may be an MRR. In an alternative implementation, the silicon photonic component 702 may be a Mach-Zehnder Interferometer (MZI) SiPh component. The stripped header is converted into electrical domain using a photodetector 704. Subsequently, the header is processed in the electrical domain using a header detector 710 and the header detector 710 controls a router 708 that redirects the data packet according the information from the header. In some embodiments router 708 is an optical router.

The remainder of the data packet is communicated to an optical delay line 706. The optical delay line 706 delays the data packet in the optical domain for a time period that may be necessary to process the header in the electrical domain to obtain the routing information from the header and to set up appropriate routing switches on the router 708. In one implementation, the optical delay line 706 adds a delay of approximately 5 ns. The optical delay line 706 providing approximately 5 ns of delay may be approximately 25 m in length.

Thus, the communication network 700 provides an optical fabric with switching control information embedded in a header of optical packets traveling on the communication network 700. The communication network 700 uses the optical delay line 706 such that the header does not have to be processed in the optical domain. On the other hand, it also ensures that the data packet does not leave the optical domain. In one implementation, the data packet exiting from the optical delay line 706 is communicated to the router 708 once one or more routing switches are set.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
  routing a data packet in an optical domain, the data packet comprising a first data component and a second data component;
  stripping the first data component from the data packet using a silicon photonic component;
  processing the first data component in an electrical domain;
  communicating the data packet without the first data component to an optical delay line; and
  altering a path of the data packet without the first data component towards an outgoing waveguide using a combination of a first silicon photonics (SiPh) component and a second silicon photonics (SiPh) component, wherein resonant wavelength of the second SiPh component is adjusted down as the resonant wavelength of the second SiPh component transitions from a first value of the resonant wavelength of the second SiPh component to a second value of the resonant wavelength of the second SiPh component, with the first value and the second value being on opposite sides the resonant wavelength of the first SiPh component.

2. The method of claim 1, further comprising setting one or more router switches using a data packet output from processing the first data component in the electrical domain.

3. The method of claim 2, further comprising communicating the data packet output from the optical delay line to the one or more router switches.

4. The method of claim 1, wherein the data packet does not leave the optical domain.

5. The method of claim 1, wherein the silicon photonic component is a micro-ring resonator (MRR).

6. The method of claim 1, wherein the first data component comprises a header and the second data component comprises routing information.

7. A method comprising:
  altering a path of optical signals traveling on an incoming waveguide towards an outgoing waveguide by using a combination of a first silicon photonics (SiPh) component and a second SiPh component, wherein resonant wavelength of the second SiPh component is adjusted down as the resonant wavelength of the second SiPh component transitions from a first value of the resonant wavelength of the second SiPh component to a second value of the resonant wavelength of the second SiPh component, with the first value and the second value being on opposite sides the resonant wavelength of the first SiPh component.

8. The method of claim 7, wherein the resonant wavelength of the second SiPh component is keyed down using charge carrier modulation of the second SiPh component as the resonant wavelength of the second SiPh component transitions from a first value to a second value.

9. The method of claim 7, wherein the resonant wavelength of the second SiPh component transitions from a first value to a second value in response to change in a heater power applied to the second SiPh component.

10. The method of claim 7, wherein the resonant wavelength of the second SiPh component is adjusted using charge carrier modulation of the second SiPh component by approximately 0.05 nm.

11. The method of claim 7, wherein heater components are used to change the resonant frequencies of the first and second silicon photonics components.

12. The method of claim 7, wherein each of the first and the second SiPh components is a ring resonator and the incoming waveguide, outgoing waveguide, first SiPh component and second SiPh components are connected to storage devices via a network.

13. The method of claim 7, wherein each of the first and the second SiPh components is a micro ring resonator.

14. A method comprising:
communicating optical signals over a plurality of wavelengths using a plurality of waveguides;
altering a path of optical signals traveling on an incoming waveguide towards an outgoing waveguide using a combination of at least two silicon photonics (SiPh) components, a first SiPh component configured to resonate at a first wavelength ($\lambda s_{1a}$) to direct a first component of an incoming optical signal towards the outgoing waveguide and a second SiPh component configured to resonate at a second wavelength ($\lambda s_{1b}$) to direct a second component of the incoming optical signal towards the outgoing waveguide, wherein resonant wavelength of the second SiPh component is adjusted down as the resonant wavelength of the second SiPh component transitions from a first value of the resonant wavelength of the second SiPh component to a second value of the resonant wavelength of the second SiPh component, wherein the first value and the second value being on opposite sides the resonant wavelength of the first SiPh component.

15. The method of claim 14, wherein the first component comprises a header and the second component comprises routing information.

16. The method of claim 14, further comprising directing a third component of the incoming signal toward the outgoing waveguide using a third SiPh component configured to resonate at a third wavelength ($\lambda s_{1c}$).

* * * * *